United States Patent
Li

(10) Patent No.: US 8,068,356 B2
(45) Date of Patent: Nov. 29, 2011

(54) LOW POWER ONE-SHOT BOOST CIRCUIT

(75) Inventor: Gu-Huan Li, Zhubei (TW)

(73) Assignee: Taiwan Semiconductor Manufacturing Co., Ltd., Hsin-chu (TW)

( * ) Notice: Subject to any disclaimer, the term of this patent is extended or adjusted under 35 U.S.C. 154(b) by 303 days.

(21) Appl. No.: 12/275,084

(22) Filed: Nov. 20, 2008

(65) Prior Publication Data

US 2009/0295354 A1 Dec. 3, 2009

Related U.S. Application Data

(60) Provisional application No. 61/056,665, filed on May 28, 2008.

(51) Int. Cl.
  H02M 3/18 (2006.01)
  G05F 1/10 (2006.01)
  G04G 19/00 (2006.01)
(52) U.S. Cl. ............. 363/60; 363/59; 327/536; 327/576
(58) Field of Classification Search ............... 363/21.02, 363/59, 60; 323/282, 275, 284; 327/536, 327/576
  See application file for complete search history.

(56) References Cited

U.S. PATENT DOCUMENTS

| | | | | |
|---|---|---|---|---|
| 5,034,700 A | * | 7/1991 | Herrmann et al. | 330/253 |
| 5,077,518 A | * | 12/1991 | Han | 323/275 |
| 5,636,115 A | * | 6/1997 | Drouot | 363/60 |
| 5,748,032 A | * | 5/1998 | Baek | 327/536 |
| 5,768,115 A | * | 6/1998 | Pascucci et al. | 363/59 |
| 6,278,316 B1 | * | 8/2001 | Tanzawa et al. | 327/536 |
| 6,414,881 B1 | * | 7/2002 | Fujii et al. | 365/189.09 |
| 6,429,725 B1 | * | 8/2002 | Tanzawa et al. | 327/536 |
| 6,492,862 B2 | * | 12/2002 | Nakahara | 327/536 |
| 6,556,064 B1 | * | 4/2003 | Yatabe | 327/536 |
| 6,654,296 B2 | * | 11/2003 | Jang et al. | 365/189.09 |
| 2002/0014909 A1 | * | 2/2002 | Akita et al. | 327/536 |
| 2004/0136212 A1 | * | 7/2004 | Abe et al. | 363/59 |
| 2005/0047181 A1 | * | 3/2005 | Yamamoto et al. | 363/60 |
| 2006/0113980 A1 | * | 6/2006 | Yoshida | 323/282 |
| 2006/0176718 A1 | * | 8/2006 | Itoh | 363/60 |
| 2006/0256592 A1 | * | 11/2006 | Yoshida et al. | 363/59 |
| 2006/0267671 A1 | * | 11/2006 | Khan et al. | 327/536 |
| 2009/0243577 A1 | * | 10/2009 | Lim | 323/283 |
| 2010/0124079 A1 | * | 5/2010 | Yang et al. | 363/21.02 |

* cited by examiner

*Primary Examiner* — Matthew Nguyen
*Assistant Examiner* — Gary Nash
(74) *Attorney, Agent, or Firm* — K&L Gates LLP

(57) ABSTRACT

This invention discloses a voltage boost circuit which comprise at least one capacitor with a first terminal connected to an output of the voltage boost circuit, a controllable switch connected between a second terminal of the capacitor and a voltage source, the second terminal being different from the first terminal, and a voltage level detector detecting the output voltage level of the voltage boost circuit and providing a control signal to the controllable switch, wherein when the output voltage exceeds a predetermined level the controllable switch is off, and when the output voltage is lower than the predetermined level the controllable switch is on.

19 Claims, 3 Drawing Sheets

LOW POWER ONE-SHOT BOOST CIRCUIT

PRIORITY DATA

The present invention claims priority to provisional patent application No. 61/056,665 filed May 28, 2008.

BACKGROUND

The present invention relates generally to integrated circuit (IC) design, and, more particularly, to a voltage boosting circuit design.

As IC geometry keeps shrinking, the supply voltage level also has to be lowered in order to work with small geometric devices. For instance, an older technology with 0.25 µm feature size uses 3.3V supply voltage, but a newer technology, such as those with 65 nm feature size, uses only 1.0V supply voltage. Such kind of low supply voltage creates design complexities as certain circuitry may still require high voltage supplies. For instance, in a Flash memory read operation, a 1.8V needs to be applied to a word-line while a main power supply voltage is 1.0V. In such case, a one-shot boost circuit is typically used to produce the 1.8V voltage from the 1.0V supply voltage. In other applications when power supply voltage has a wide range, for instance, from 1.2V to 1.8V, it is not easy to provide a fixed 1.8V with conventional one-shot boost circuit.

FIG. 1A illustrates a conventional voltage boost circuit 100 comprising a driver 102, a capacitor 106 and a voltage clamping circuit 112. The capacitor 106 is pre-charged. An input voltage at a node IN ramps up to a supply voltage VDD at a time t1. Since the voltage across the capacitor 106 cannot be changed instantly, the voltage at an output node OUT will rise up to a voltage equals to a sum of the VDD and the voltage across the capacitor 106. The voltage level at the output node OUT is controlled by the voltage clamping circuit 112, which is comprised of a certain number of serially connected, forward biased diodes. A forward biased diode provides a voltage drop across its two terminals. The voltage drop is determined by the diode's P-N junction, therefore, is very predictable and near constant.

FIG. 1B shows transient voltage characteristics at the nodes N1 and OUT of the voltage boost circuit 100. The node N1 voltage, V_N1, is driven to VDD at the time t1. The node OUT voltage, V_OUT, has an undesirable spike 122 at the rising edge of the V_OUT. Therefore, the conventional voltage boost circuit 100 has longer setup time. Since the conventional voltage boost circuit 100 clamps voltage by essentially using forward biased diodes to shun current, its power consumption is high. Besides, the clamping voltage level is determined by the P-N junction and may subject to implant variations.

As such, what is desired is a voltage boost circuit that can overcome the aforementioned shortcomings of the conventional voltage boost circuit.

SUMMARY

This invention discloses a voltage boost circuit which comprise at least one capacitor with a first terminal connected to an output of the voltage boost circuit, a controllable switch connected between a second terminal of the capacitor and a voltage source, the second terminal being different from the first terminal, and a voltage level detector detecting the output voltage level of the voltage boost circuit and providing a control signal to the controllable switch, wherein when the output voltage exceeds a predetermined level the controllable switch is off, and when the output voltage is lower than the predetermined level the controllable switch is on.

In one embodiment of the present invention, the aforementioned controllable switch is made of a PMOS transistor with a gate connected to the control signal. In another embodiment of the present invention, the voltage level detector comprises a voltage comparator for comparing the output voltage with a reference voltage and thereby generating the control signal.

The construction and method of operation of the invention, however, together with additional objectives and advantages thereof will be best understood from the following description of specific embodiments when read in connection with the accompanying drawings.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein.

DESCRIPTION

The present invention discloses voltage boost circuit that uses a switching transistor to control an output voltage so that the output voltage can be precisely controlled without overshooting issue, and has shorter setup time and lower power consumption than conventional voltage boost circuit. This is better understood by reference to the drawings and the following description.

Figure 1A:
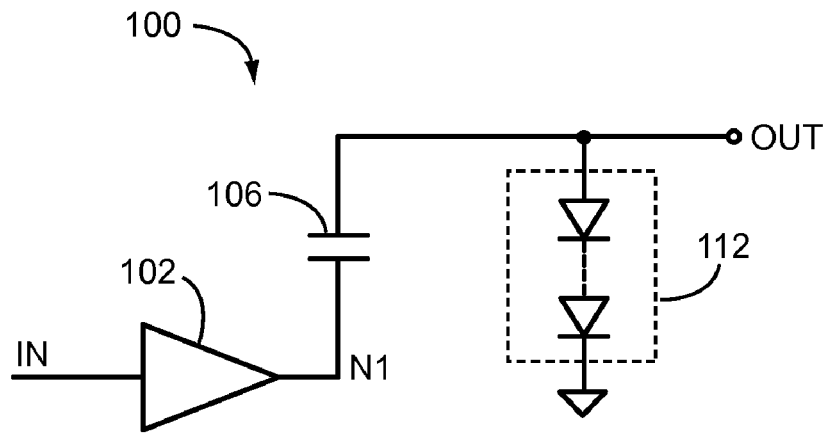
FIGS. 1A and 1B illustrate a conventional voltage boost circuit and output voltage characteristics thereof, respectively.
Figure 1B:
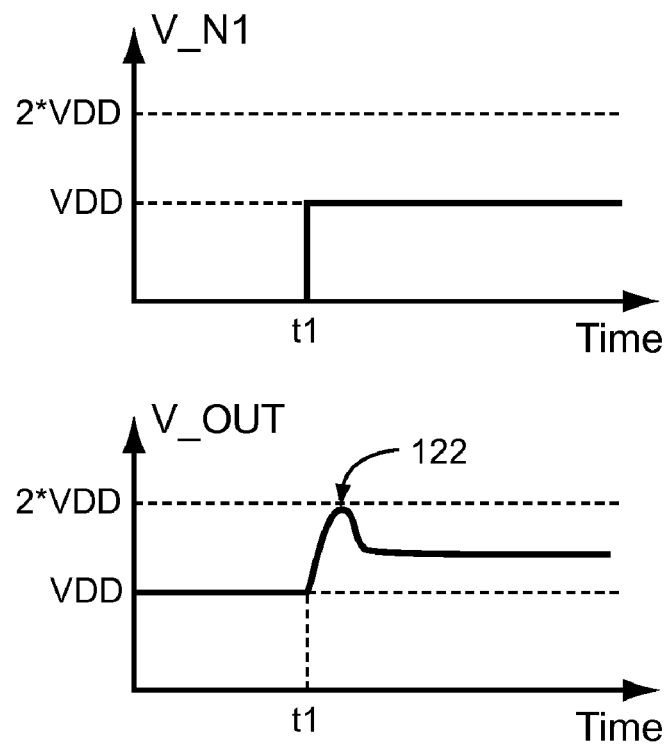
Figure 2A:
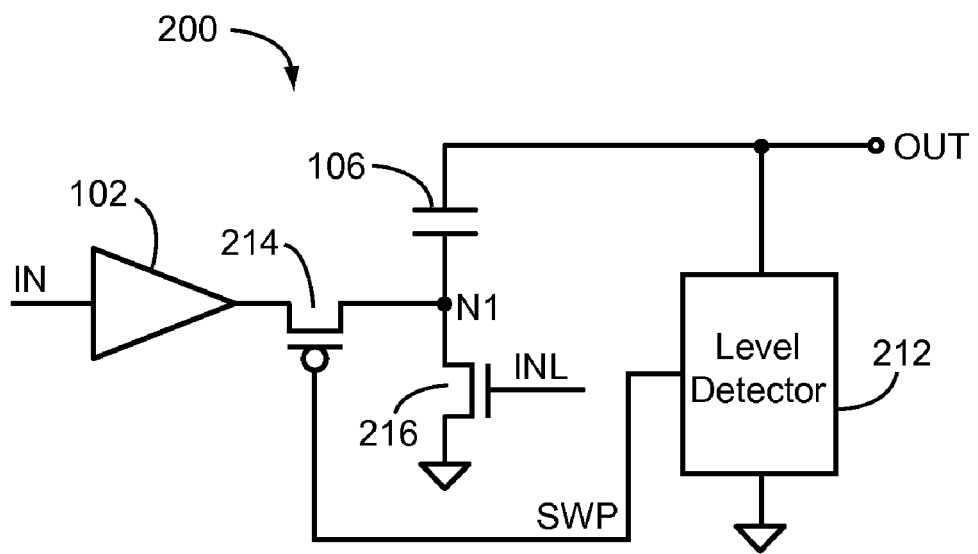
FIGS. 2A and 2B illustrate a voltage boost circuit according to one embodiment of the present invention and output voltage characteristics thereof, respectively.
Figure 2B:
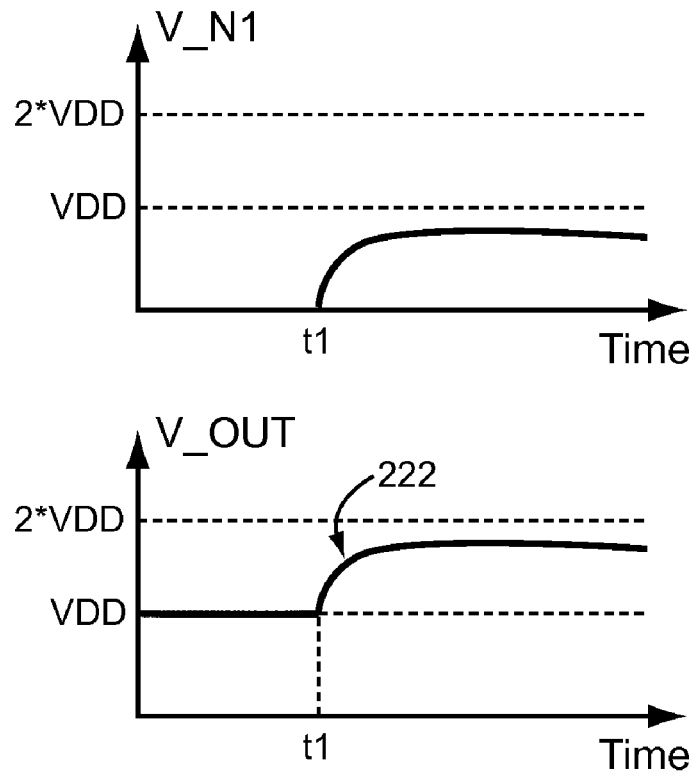

FIGS. 2A and 2B illustrate a voltage boost circuit 200 according to one embodiment of the present invention and output voltage characteristics thereof, respectively. Referring to FIG. 2A in view of FIG. 1A, the voltage boost circuit 200 is a modification from the conventional voltage boost circuit 100. The driver 102, the capacitor 106 are still used in the voltage boost circuit 200. Additionally, a PMOS transistor implemented switch 214, an NMOS transistor implemented switch 216 and a voltage level detector 212 are also used. The PMOS transistor switch 214 is serially connected between an output of the driver 102 and the node N1. The voltage level detector 212 detects an output voltage at the node OUT (V_OUT), and generates a control signal at a node SWP, which is connected to a gate of the PMOS transistor switch 214. When the V_OUT exceeds a predetermined level, the control signal at the node SWP will swing to a logic HIGH and turn off the PMOS transistor switch 214, then the node OUT is driven only by the charge stored in the capacitor 106. On the other hand, when the V_OUT is below a predetermined level, the control signal at the node SWP will stay at a logic LOW and turn on the PMOS transistor switch 214 to allow the input voltage at the node IN to drive the V_OUT through the capacitor 106. The source and drain of a NMOS transistor switch 216 is connected between the node N1 and a ground VSS. A gate of the NMOS transistor switch 216 is controlled by a signal INL. The NMOS transistor switch 216 provides a controlled discharging path for the capacitor 106. The control signal INL and the input signal IN are synchronized to initialize and reset the voltage at the node N1.

Referring to FIG. 2B, when the input voltage at the node IN swing from 0V to VDD at time t1, the V_N1's rise is slight tempered due to resistance of the PMOS transistor switch 214. Because the PMOS transistor switch 214 can be turned off instantly when the V_OUT reaches the predetermined level, the V_OUT's rise 222 is depleted of any overshoot. Without overshoot, the voltage boost circuit 200 has shorter setup time. Because the V_OUT is clamped by the ON/OFF switch of the PMOS transistor 214, instead of the current shunning mechanism found in the conventional voltage boost circuit 100, the voltage boost circuit 200 has lower power consumption during high voltage generation.

Figure 3:
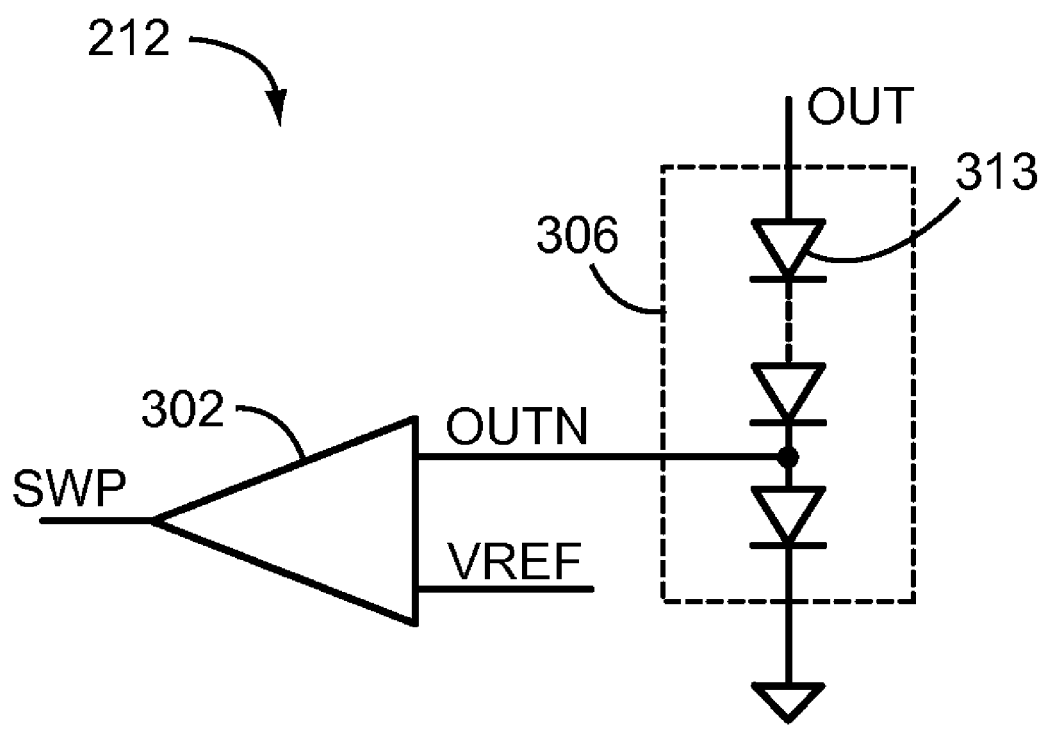
FIG. 3 is a schematic diagram illustrating an implementation of a voltage level detector used in the voltage boost circuit of FIG. 2A.

FIG. 3 is a schematic diagram illustrating an implementation of the voltage level detector 212 used in the voltage boost circuit 200 of FIG. 2A. The voltage level detector 212 comprises a voltage divider 306 providing a portion of the V_OUT at a node OUTN to an input of a voltage comparator 302. Another input of the voltage comparator 302 is supplied with a reference voltage VREF. An output of the voltage comparator 302 is connected to the node SWP which is connected to the gate of the PMOS transistor switch 214 of FIG. 2A. When the voltage at the node OUTN is higher than the VREF, the voltage at the node SWP is at the logic HIGH for turning off the PMOS transistor switch 214. When the voltage at the node OUTN is lower than the VREF, the voltage at the node SWP is at the logic LOW for turning on the PMOS transistor switch 214.

Referring again to FIG. 3, the voltage divider 306, as an example, comprises a string of serially connected and forward-biased diodes 313. Since the diode string here does not provide a current shunning path for the output node OUT, the diode transistor size can be made very small, and hence drains very little current. The node OUTN is connected to an interconnect nodes in the string of diodes 313, therefore a certain portion of the voltage between the node OUT and the VSS is present at the node OUTN. If a total number of diode 313 is 3, and the node OUTN is connected to an inter-connect between the first and second diode 313 away from the VSS, then V_OUTN equals V_OUT divided by three which is also the VREF's target value. Since all that matters to the V_OUTN is the ratio of the number of diodes 313 between the nodes OUTN and OUT and the number of diodes 313 between the node OUTN and the VSS, the V_OUTN is not affected by implant variations in the diodes 313. A skilled artisan will have no difficulty to device a reference voltage generator which is much predictable and stable than a simple diode string 112 of FIG. 1A can produce.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims.

Accordingly, it is appropriate that the appended claims be construed broadly and in a manner consistent with the scope of the invention, as set forth in the following claims.

What is claimed is:

1. A voltage boost circuit comprising:
  a driver having an input receiving a first input signal and an output;
  at least one capacitor with a first terminal connected to an output of the voltage boost circuit;
  a first controllable switch connected between a second terminal of the capacitor and the output of the driver, the second terminal being different from the first terminal;
  a second controllable switch connected between the second terminal of the capacitor and a ground, wherein the second controllable switch is turned on or off by a second input signal for selectively providing a discharging path for the capacitor; and
  a voltage level detector coupled between the first terminal and the ground for detecting an output voltage at the output of the voltage boost circuit and providing a control signal to the first controllable switch, the second input signal being different from the control signal, and wherein when the output voltage exceeds a predetermined level, the first controllable switch is turned off, and when the output voltage is lower than the predetermined level, the first controllable switch is turned on.

2. The voltage boost circuit of claim 1, wherein the first controllable switch is a PMOS transistor.

3. The voltage boost circuit of claim 1, wherein the voltage level detector comprises a voltage comparator for comparing the output voltage with a reference voltage.

4. The voltage boost circuit of claim 3, wherein the voltage level detector further comprises a voltage divider for obtaining a portion of the output voltage for comparing with the reference voltage.

5. The voltage boost circuit of claim 4, wherein the voltage divider comprises a string of serially-connected and forward-biased diodes.

6. The voltage boost circuit of claim 1, wherein the second controllable switch includes an NMOS transistor with a drain connected to the second terminal of the capacitor, a source connected to the ground and a gate controlled by the second input signal.

7. The voltage boost circuit of claim 6, wherein the second input signal is synchronized with the first input signal.

8. A voltage boost circuit comprising:
  a driver having an input receiving a first input signal and an output;
  at least one capacitor with a first terminal connected to an output of the voltage boost circuit;
  a PMOS transistor with a source and a drain connected to the output of the driver and a second terminal of the capacitor, respectively, the second terminal being different from the first terminal;
  an NMOS transistor connected between the second terminal of the capacitor and a ground, wherein the NMOS transistor is turned on or off by a second input signal for selectively providing a discharging path for the capacitor; and
  a voltage level detector coupled between the first terminal and the ground for detecting an output voltage at the output of the voltage boost circuit and providing a control signal to a gate of the PMOS transistor, the second input signal being different from the control signal, and wherein when the output voltage exceeds a predetermined level, the PMOS transistor is turned off, and when the output voltage is lower than the predetermined level, the PMOS transistor is turned on.

9. The voltage boost circuit of claim 8, wherein the voltage level detector comprises a voltage comparator for comparing the output voltage with a reference voltage.

10. The voltage boost circuit of claim 9, wherein the voltage level detector further comprises a voltage divider for obtaining a portion of the output voltage for comparing with the reference voltage.

11. The voltage boost circuit of claim 10, wherein the voltage divider comprises a string of serially-connected and forward-biased diodes.

12. The voltage boost circuit of claim 8, wherein a drain of the NMOS transistor is connected to the second terminal of the capacitor, a source connected to the ground and a gate controlled by the second input signal.

13. The voltage boost circuit of claim 12, wherein the second input signal is synchronized with the first input signal.

14. A voltage boost circuit comprising:
   a driver having an input receiving a first input signal and an output;
   at least one capacitor with a first terminal connected to an output of the voltage boost circuit;
   a first controllable switch connected between a second terminal of the capacitor and the output of the driver, the second terminal being different from the first terminal; and
   a second controllable switch connected between the second terminal of the capacitor and a ground, wherein the second controllable switch is turned on or off by a second input signal for selectively providing a discharging path for the capacitor;
   a voltage comparator coupled between the first terminal and the ground for comparing an output voltage at the output of the voltage boost circuit with a reference voltage and providing a control signal to the first controllable switch, the second input signal being different from the control signal, and
   wherein when the output voltage exceeds a predetermined level, the first controllable switch is turned off, and when the output voltage is lower than the predetermined level, the first controllable switch is turned on.

15. The voltage boost circuit of claim 14, wherein the controllable switch is a PMOS transistor.

16. The voltage boost circuit of claim 14 further comprising a voltage divider for generating a portion of the output voltage for comparing with the reference voltage by the voltage comparator.

17. The voltage boost circuit of claim 16, wherein the voltage divider comprises a string of serially-connected and forward-biased diodes.

18. The voltage boost circuit of claim 14, wherein the a drain of the NMOS transistor is connected to the second terminal of the capacitor, a source connected to the ground and a gate controlled by the second input signal.

19. The voltage boost circuit of claim 18, wherein the second input signal is synchronized with the first input signal.

* * * * *